(12) United States Patent
Lam

(10) Patent No.: US 9,746,753 B2
(45) Date of Patent: Aug. 29, 2017

(54) PROJECTOR WITH EMBEDDED ELECTRIC SUSPENSION ARM

(71) Applicant: Techislive Limited, Hong Kong (HK)

(72) Inventor: Mo Kin Lam, Hong Kong (HK)

(73) Assignee: TECHISLIVE LIMITED, Hong Kong (HK)

(*) Notice: Subject to any disclaimer, the term of this patent is extended or adjusted under 35 U.S.C. 154(b) by 35 days.

(21) Appl. No.: 14/609,414

(22) Filed: Jan. 29, 2015

(65) Prior Publication Data

US 2015/0212398 A1 Jul. 30, 2015

(30) Foreign Application Priority Data

Jan. 30, 2014 (CN) .......................... 2014 1 0044183

(51) Int. Cl.
| | |
|---|---|
| G03B 21/14 | (2006.01) |
| F16M 13/02 | (2006.01) |
| F16M 11/18 | (2006.01) |
| F16M 11/26 | (2006.01) |
| G03B 21/00 | (2006.01) |
| G03B 21/16 | (2006.01) |

(52) U.S. Cl.
CPC ........... *G03B 21/145* (2013.01); *F16M 11/18* (2013.01); *F16M 11/26* (2013.01); *F16M 13/022* (2013.01); *F16M 13/027* (2013.01); *G03B 21/005* (2013.01); *G03B 21/16* (2013.01)

(58) Field of Classification Search
CPC ...... G03B 21/145; F16M 11/18; F16M 11/24; F16M 11/28; F16M 11/32; F16M 13/02; F16M 13/022; F16M 13/027
See application file for complete search history.

(56) References Cited

U.S. PATENT DOCUMENTS

| | | | | |
|---|---|---|---|---|
| 3,822,051 A * | 7/1974 | Karapita | ............... | F16B 7/10 |
| | | | | 248/333 |
| 4,750,832 A * | 6/1988 | Lloyd, Sr. | ............. | F16M 11/18 |
| | | | | 352/104 |
| 4,941,718 A * | 7/1990 | Alexander, III | ........ | B60R 11/02 |
| | | | | 296/37.7 |
| 5,261,645 A * | 11/1993 | Huffman | ................ | E04B 9/003 |
| | | | | 248/277.1 |
| 5,366,203 A * | 11/1994 | Huffman | ................ | E04B 9/003 |
| | | | | 248/277.1 |
| 6,073,892 A * | 6/2000 | Dittmer | .................. | F16D 55/36 |
| | | | | 248/157 |
| 7,523,919 B2 * | 4/2009 | Hanlon | .................... | B66D 1/12 |
| | | | | 248/324 |
| 7,929,050 B2 * | 4/2011 | Lian | .................. | H04N 1/00519 |
| | | | | 348/373 |

(Continued)

FOREIGN PATENT DOCUMENTS

GB 2369564 A * 6/2002 ............. F16M 11/18

*Primary Examiner* — Bao-Laun Le

(57) ABSTRACT

A projector includes a main body, sub-body having an optical engine system, and a telescopic electric suspension arm, of which a first end is fixed in the main body, and a second end is connected to the sub-body. When the electric suspension arm retracts, the projector is in a closed position, where the sub-body and the electric suspension arm are both placed in the main body; and when the electric suspension arm extends, the projector is in an open position, and the sub-body moves out from the main body.

18 Claims, 3 Drawing Sheets

(56) References Cited

U.S. PATENT DOCUMENTS

| | | | | |
|---|---|---|---|---|
| 8,029,148 B2* | 10/2011 | Liu | ........................ | G03B 21/30 353/119 |
| 2005/0139742 A1* | 6/2005 | Frisell | .................. | F16M 11/043 248/317 |
| 2007/0145223 A1* | 6/2007 | Huang | ................... | G03B 21/54 248/333 |
| 2007/0247599 A1* | 10/2007 | Kadowaki | .............. | F16M 11/28 353/101 |
| 2010/0039627 A1* | 2/2010 | Liu | ........................ | G03B 21/30 353/119 |
| 2012/0024091 A1* | 2/2012 | Kawabuchi | .............. | B25J 9/045 74/37 |

* cited by examiner

PROJECTOR WITH EMBEDDED ELECTRIC SUSPENSION ARM

CROSS-REFERENCE TO RELATED APPLICATIONS

This application claims the benefit of Chinese Patent Application No. 201410044183.7 filed on Jan. 30, 2014, the entire content of which is hereby incorporated by reference.

TECHNICAL FIELD

The present patent application relates to a projector.

BACKGROUND

As a kind of device for projecting digital images and videos, projectors are widely applied in education, business, home entertainment, and other fields and function as playback devices like TV sets. The difference in working features between a projector and a TV set lies in that the projector needs to work with a separate screen to display an image.

The projector projects light beams of an image through a projection lens of an optical system to a screen at a certain distance so as to display the image. The size of an image projection is in direct proportion to the distance between the projection lens and the screen. The horizontal direction, vertical direction, and azimuth angle of the light beams of the image are required to be precisely aligned with the screen; otherwise, the image will have problems such as keystone effect.

Although the projector generally has a keystone correction function to solve this problem, the keystone correction function distorts the image. Therefore, the horizontal direction, vertical direction, and azimuth angle of the projector are required to be precisely aligned with the screen during installation, so as to achieve an optimal image display performance. Therefore, the projector needs to be installed by technicians specializing in this field.

When a projector is used, people usually adopt the following mounting manners: hanging the projector on a wall, directly supporting the projector on a desktop, or suspending the projector from a ceiling.

The manner of hanging the projector on a wall is usually used for short-focus projectors, in which a special wall bracket is used and the projector can be fixed horizontally to project a large image on a screen at a short distance. This manner is usually used in occasions such as interactive education and conferences. The length of a suspension arm of the wall bracket affects the size of an image projection, and usually a sufficiently long suspension arm is used to generate a sufficiently large image. However, due to the leverage effect of the horizontal bracket, an excessive load on the suspension arm leads to a considerably large bending force on the suspension arm. Therefore, a general solution is to use a projector with a shorter focal length or a lighter projector, so as to reduce the length of the suspension arm or the bending force on the suspension arm.

In the manner of supporting the projector on a desktop, the position of the projector needs to be changed frequently. When it is inconvenient to use a bracket to fix the projector, this manner is the simplest. However, to make the projector project an image to a proper height while being precisely aligned with a screen, the projector needs to be placed on a desktop at a proper height, which causes inconvenience.

In the manner of suspending the projector from a ceiling, the projector is fixedly hung upside down from the ceiling by using a special bracket, and the height of an image projection can be correspondingly adjusted by adjusting the length of a suspension arm of the bracket. This manner is adopted by most people, and especially, is widely applied to home entertainment to play large-screen high-definition films. When the projector is for home use, people have preferences for appearance and the space it occupies. It is generally considered that a bracket hung from the ceiling destroys the aesthetics of home furnishing, and therefore, an electric bracket is designed.

The electric bracket can hide the projector in a false ceiling when the projector is not in use, and hang the projector down when it is in use, thereby solving the problems concerning the aesthetics of home furnishing and the space occupied by the projector. However, the electric bracket needs a high-power motor to drive the whole projector lifting system, and therefore has the following problems: a heavy electric bracket, a large occupied space, high costs, a sacrifice of a vertical space in a house, and a need of a false ceiling.

In addition, installation of the electric bracket needs to be completed by professional technicians because it involves specialized techniques and complex procedures. Therefore, considerable labor costs are incurred. Because there is no standard or specification for a connection interface between a bracket and a projector, and parameters such as shape, weight, and mounting hole of different projectors are not necessarily the same, special brackets or brackets suitable for projectors of different shapes and weights are needed. Some projector manufacturers therefore provide special brackets matching their own projectors. Universal brackets suitable for installation of most projectors are also designed, in which special components such as movable irregular hinge elements are attached to the bracket, and many hole sites or wide hole sites are provided in the bracket, so as to cater for different shapes, positions, distances, and numbers of mounting hole sites of projectors.

However, the universal bracket has a lot of movable joints, which become loose easily, and need to be calibrated before being connected to the projector. In addition, adding these accessories sacrifices the overall aesthetics of and increases the space occupied by a projector installation system, adds additional procedures, and also makes the fixation and installation of the projector less firm.

Further, prior to the present patent application, to implement the lifting function into a projector system, a person skilled in the art generally conceives of an additional electric bracket, and considers it to be the most convenient and universal solution.

Since 1968 when the first LCD projector appeared, all text books, technical publications, technicians, and even installation manuals of projector manufacturers use such technical means as the only solution, and it has become conventional and common knowledge. None of the large number of periodicals, patent documents and products for improving the performance and appearance of the electric bracket system of the projector goes beyond this knowledge. Considering the external bracket, which is universal and can fit different projectors, as the most convenient projector installation solution, people exclude possibilities and technical solutions from other aspects.

However, the applicant considers that such knowledge deviates from the objective fact because there is no standard or exemplar for a connection interface between a bracket and a projector, and parameters such as shape, weight, and mounting hole of different projectors are not necessarily the same, and as a result, special brackets are needed. As described in the background, the special brackets have a lot of problems.

The present patent application uses a technical solution different from the prior art, and uses an embedded electric suspension arm to drive a movable optical engine system, which not only achieves the projector raising/lowering function in the prior art, but also brings better effects, and avoids technical problems caused by the non-standard connection between the bracket and the projector.

SUMMARY

According to one aspect, there is provided a projector including a main housing defining a cavity, and having a front opening and a side opening; a sub-housing in which an optical engine system is mounted; and at least one electric suspension arm having a first end connected to the main housing and a second end connected to the sub-housing. The sub-housing is movable between a retracted position where both the sub-housing and the electric suspension arm are received in the cavity, and an extended position where the sub-housing is extended out from the main housing. The electric suspension arm may be in the form of a telescopic arm.

A main circuit board, a power source unit, and an input/output interface may be provided in the main housing; and the power source unit and the input/output interface may be connected to the main circuit board. A motor and a gear set may be provided in the main housing. The motor may be connected to the power source unit and can be controlled by the main circuit board. The gear set can decelerate output rotation of the motor and transmits the rotation to the electric suspension arm.

In one embodiment, the input/output interface may include an operator control interface for controlling overall operation of the projector. The overall operation may include ascending or descending operation and projection operation of the sub-body.

In one embodiment, the optical engine system may include a light source, a lens set, an image-processing chip, and a projection lens.

In one embodiment, a sub-circuit board may be provided in the sub-housing, and the sub-circuit board can be electrically connected to the main circuit board and controls operation of the optical engine system.

In one embodiment, the projector may include two telescopic electric suspension arms provided on two opposite sides of the optical engine system.

According to another aspect, there is provided a projector having a main body; a sub-body comprising an optical engine system; and a telescopic electric suspension arm comprising a first end fixed in the main body and a second end connected to the sub-body. When the electric suspension arm retracts, the projector is in a closed position, and both the sub-body and the electric suspension arm are received in the main body; and when the electric suspension arm extends, the projector is in an open position, and the sub-body moves out from the main body.

The main body may include a main housing that defines a cavity. The sub-body may include a sub-housing. In the closed position, the sub-body is located inside the cavity, and the main housing and the sub-housing form a continuous projector contour.

The main housing may include a main housing first surface and a main housing second surface that are opposite to each other, and a main housing front surface can be connected between the main housing first surface and the main housing second surface. The main housing first surface can be a mounting surface or a support surface of the projector, and the cavity has a first opening on the main housing second surface and a second opening on the main housing front surface. The sub-housing may include a sub-housing first surface and a sub-housing second surface that are opposite to each other, and a sub-housing front surface can be connected between the sub-housing first surface and the sub-housing second surface. In the closed position, the sub-housing front surface aligns with the main housing front surface, and the sub-housing second surface aligns with the main housing second surface.

The first opening has a same shape and size as the sub-housing second surface; and the second opening has a same shape and size as the sub-housing front surface such that the sub-housing front surface is capable of being inserted therein smoothly.

The projector can be mounted on a ceiling or supported on a desktop by the main housing first surface, and a retraction direction of the electric suspension arm is perpendicular to the main housing first surface.

In one embodiment, the main body may include a main circuit board, a power source unit, and an input/output interface that are provided in the main housing; and the power source unit and the input/output interface are connected to the main circuit board. The main body may further include a motor and a gear set that are provided in the main housing. The motor can be connected to the power source unit and can be controlled by the main circuit board. The gear set can decelerate output rotation of the motor and transmits the rotation to the electric suspension arm. The input/output interface may include an operator control interface for controlling overall operation of the projector, and the overall operation may include ascending or descending operation and projection operation of the sub-body.

In one embodiment, the optical engine system may be provided in the sub-housing and may include a light source, a lens set, an image-processing chip, and a projection lens. The sub-body may further include a sub-circuit board arranged in the sub-housing, and the sub-circuit board can be electrically connected to the main circuit board and controls operation of the optical engine system. The sub-body may further include a heat dissipation unit provided in the sub-housing for dissipating heat from the optical engine system.

In one embodiment, the projector may include a remote control for controlling overall operation of the projector, and wherein the overall operation may include ascending or descending operation and projection operation of the sub-body.

The projector of the present patent application may have the following technical effects compared with the similar prior art. The projector of the present patent application may render an external bracket, additional components, complex procedures, and an extra control system unnecessary, and reduce the costs for mounting an electric bracket on a ceiling. The projector may reduce the overall weight and volume of the projector lifting system. The projector may reduce the depth and space of the false ceiling for hiding the projector system, and the electric motor can also be hidden without using a false ceiling, which improves the aesthetics. The projector may facilitate a height adjustment for an image projection during operation of the projector supported on a desktop. The projector may improve the heat dissipation effect of the optical engine system and lowers the noise of a cooling fan during working of the projector. The projector can be firmly held in a safe position upon installation. The lifting system of the projector may be more precise. The projector may simplify the steps of separately operating the projector and the lifting system in the prior art. The projector may lower power consumption and noise during operation compared with the electric bracket.

These technical effects will help cultivate commercial success for the projector.

Although the projector is shown and described with respect to certain embodiments, it is obvious that equivalents and modifications will occur to others skilled in the art upon the reading and understanding of the specification. The projector in the present application includes all such equivalents and modifications, and is limited only by the scope of the claims.

DETAILED DESCRIPTION

Feasible implementation manners of the present patent application are described in the following with reference to the accompanying drawings.

Figure 1:
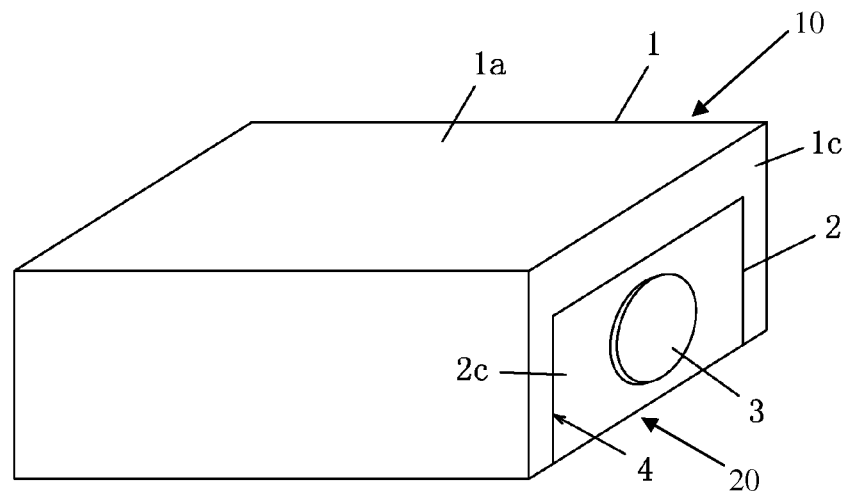
FIG. 1 is a perspective view illustrating a closed state of a projector according to a first embodiment of the present patent application when the projector is suspended from a ceiling.
Figure 2:
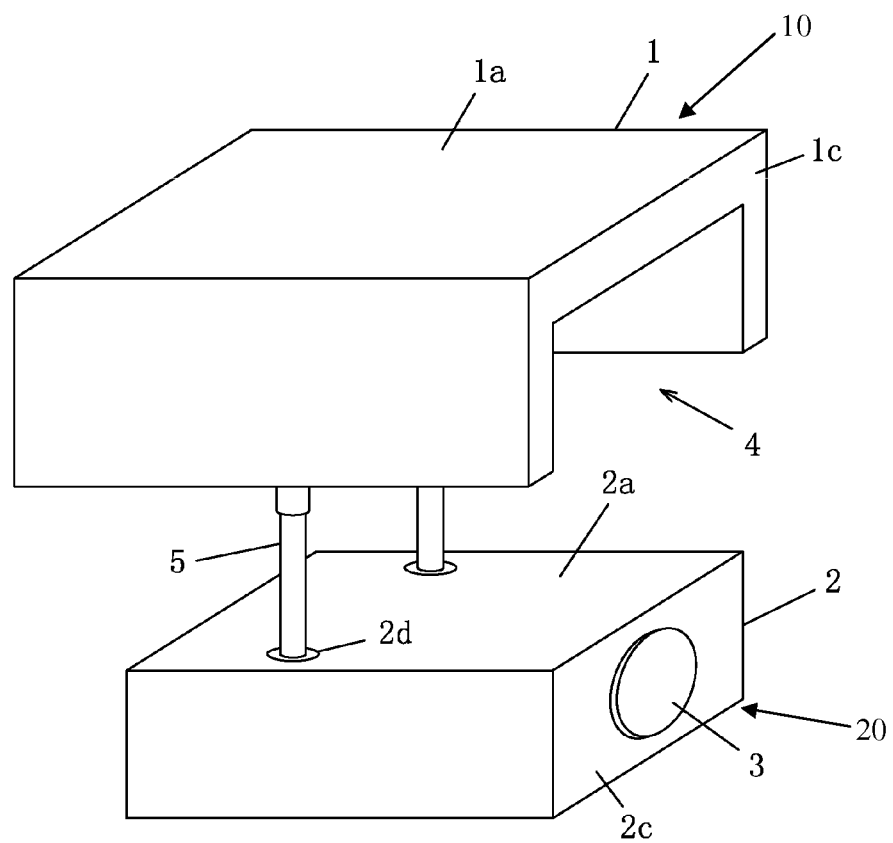
FIG. 2 is a perspective view illustrating an open state of the projector in FIG. 1 when the projector is suspended from a ceiling.
Figure 3:
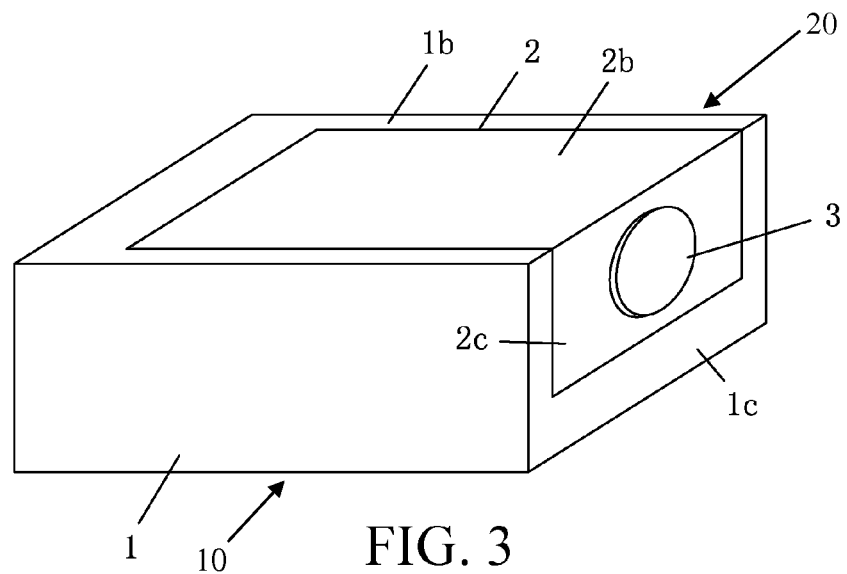
FIG. 3 is a perspective view illustrating a closed state of the projector in FIG. 1 when the projector is supported on a desktop.
Figure 4:
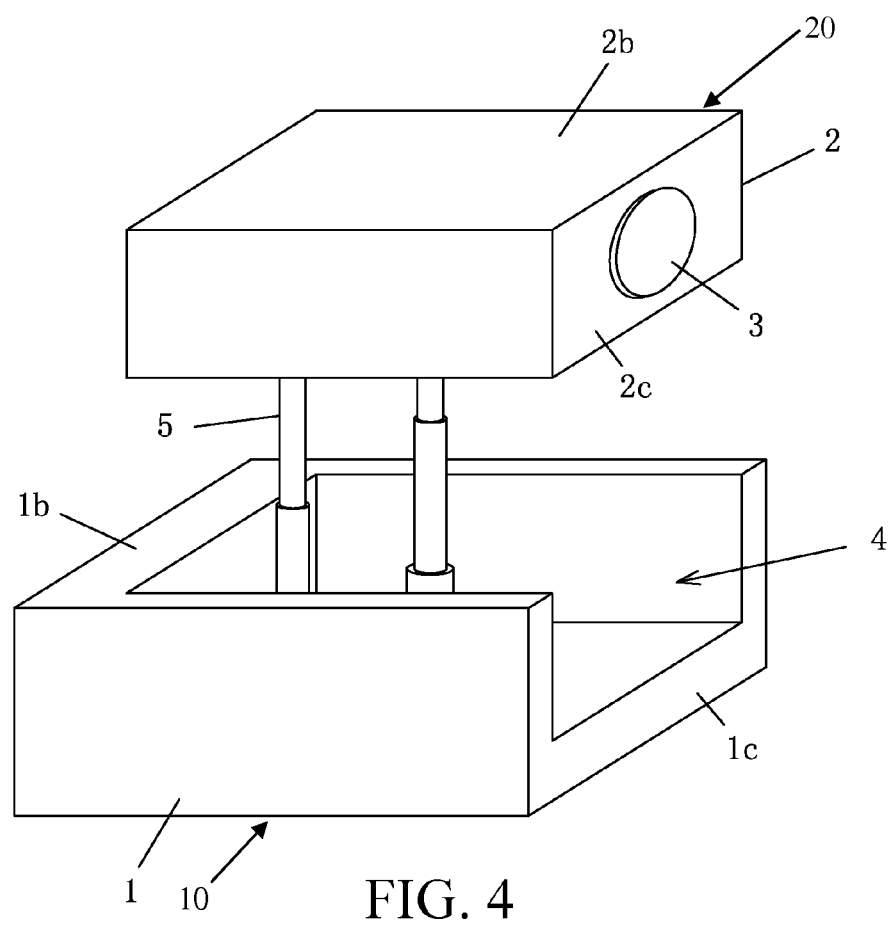
FIG. 4 is a perspective view illustrating an open state of the projector in FIG. 1 when the projector is supported on a desktop.

First, with reference to FIG. 1 to FIG. 4, a projector according to an embodiment of the present patent application may mainly include a main body 10, a sub-body 20 and a telescopic electric suspension arm 5. The sub-body 20 may have a projection lens 3, and is suitable to be received in a cavity 4 defined in the main body 10 when the projector is in a retracted or closed position (as shown in FIG. 1 and FIG. 3). The telescopic electric suspension arm 5 may movably connect the sub-body 20 to the main body 10. The telescopic electric suspension arm 5 can be nested in the cavity 4 together with the sub-body 20 when the projector is in the closed position. As shown in FIG. 2 and FIG. 4, the telescopic electric suspension arm 5 can extend when the projector is in an extended or open position so that the sub-body 20 can move out from the main body 10.

The main body 10 may have a contour defined by a main housing 1, such as a substantially cuboid shape shown in the figures. The main housing 1 may include a first surface 1a which is substantially a flat surface, a second surface 1b opposite to the first surface 1a, a front surface 1c connected between front edges of the first surface 1a and the second surface 1b; a rear surface opposite to the front surface 1c; and two lateral surfaces respectively connected between edges on two sides of the first surface 1a and the second surface 1b. The first surface 1a may function as a mounting surface or support surface of the projector, and may be mounted from a ceiling or supported on a desktop or a surface.

The sub-body 20 may have a contour defined by a sub-housing 2, such as a substantially cuboid shape shown in the figures. The sub-housing 2 may include a first surface 2a; a second surface 2b; a front surface 2c connected between front edges of the first surface 2a and the second surface 2b; a rear surface opposite to the front surface 2c; and two lateral surfaces separately connected between edges on two sides of the first surface 2a and the second surface 2b. The projection lens 3 may protrude from the front surface 2c and point to the front.

The cavity 4 may have a first or side opening on the second surface 1b and a front or second opening on the front surface 1c of the main housing 1, and may be recessed towards the interior of the main housing 1. The cavity 4 may be sized and shaped to accommodate therein the sub-body 20 and enable the main housing 1 and the sub-housing 2 to form a continuous projector contour when the projector is in the closed position. Specifically, the first opening defined by the cavity 4 on the second surface 1b of the main housing 1 may have the same shape and size as the second surface 2b of the sub-housing 2, and the second opening defined by the cavity 4 on the front surface 1c of the main housing 1 may have the same shape and size as the front surface 2c of the sub-housing 2, and is formed in such manner that the front surface 2c of the sub-housing 2 can be inserted therein smoothly. In the closed position, the front surface 2c of the sub-housing 2 may align with the front surface 1c of the main housing 1, and the second surface 2b of the sub-housing 2 may align with the second surface 1b of the main housing 1, as shown in FIG. 1 and FIG. 3.

It can be understood that, the projector of the present patent application only requires that the main body 10 and the sub-body 20 form a continuous projector contour when the projector is in the closed position. Therefore, for the sub-housing 2, only the second surface 2b and the front surface 2c are necessary, and the other surfaces may be omitted or may be incomplete. It is beneficial to structure arrangement and heat dissipation of the projector.

A first end of the electric suspension arm 5 may be fixed to the main body 10, and a second end of the electric suspension arm 5 may be connected to the sub-body 20. A through hole for the electric suspension arm 5 to pass through may be provided in the first surface 2a of the sub-housing 2.

In the example shown in the figures, a pair of electric suspension arms 5 may be located in a parallel manner on the left and right sides of the projector. It can be understood that, the number and the location of the electric suspension arms 5 are not limited to the illustrated example. For example, when the sub-body 20 is relatively light, one electric suspension arm 5 may be enough. When the sub-body 20 is relatively heavy, three or more electric suspension arms 5 may be needed.

The electric suspension arm 5 can be mounted perpendicular to the first surface 1a of the main housing 1, and can be extendable, so that the sub-body 20 extends out of the cavity 4 along a direction perpendicular to the first surface 1a of the main housing 1. An extension length of the electric suspension arm 5 can be adjusted and can also be locked so that the electric suspension arm 5 can drive the sub-body 20 to a position at a proper distance from the main body 10 and lock the sub-body 20 at this position.

FIG. 1 and FIG. 2 show the projector in a ceiling suspension mounting position, where the first surface 1a of the main housing 1 is horizontally placed and faces upward. The first surface 1a in this position can be fixed on the ceiling by using, for example, a screw or an expansion bolt.

In the closed position shown in FIG. 1, the sub-body 20 and the electric suspension arm 5 are completely recessed within the outer contour defined by the main body 10, and therefore do not occupy any extra space.

In the open position shown in FIG. 2, the electric suspension arm 5 extends downward, so as to drive the sub-body 20 to a position which is vertically below the main body 10 and at a proper distance from the main body 10, and then the projector can be used. After use, the electric suspension arm 5 may be retracted, so as to bring the sub-body 20 back into the main body 10.

FIG. 3 and FIG. 4 show the projector in a desktop support position, where the first surface 1a of the main housing 1 is placed horizontally and faces downwards. The first surface 1a in this position can be directly placed on a horizontal desktop or surface.

In the open position shown in FIG. 4, the electric suspension arm 5 extends upward, so as to drive the sub-body 20 to a position which is vertically above the main body 10 and at a proper distance from the main body 10, and then the projector can be used. After use, the electric suspension arm 5 may be retracted, so as to bring the sub-body 20 back into the main body 10.

Figure 5:
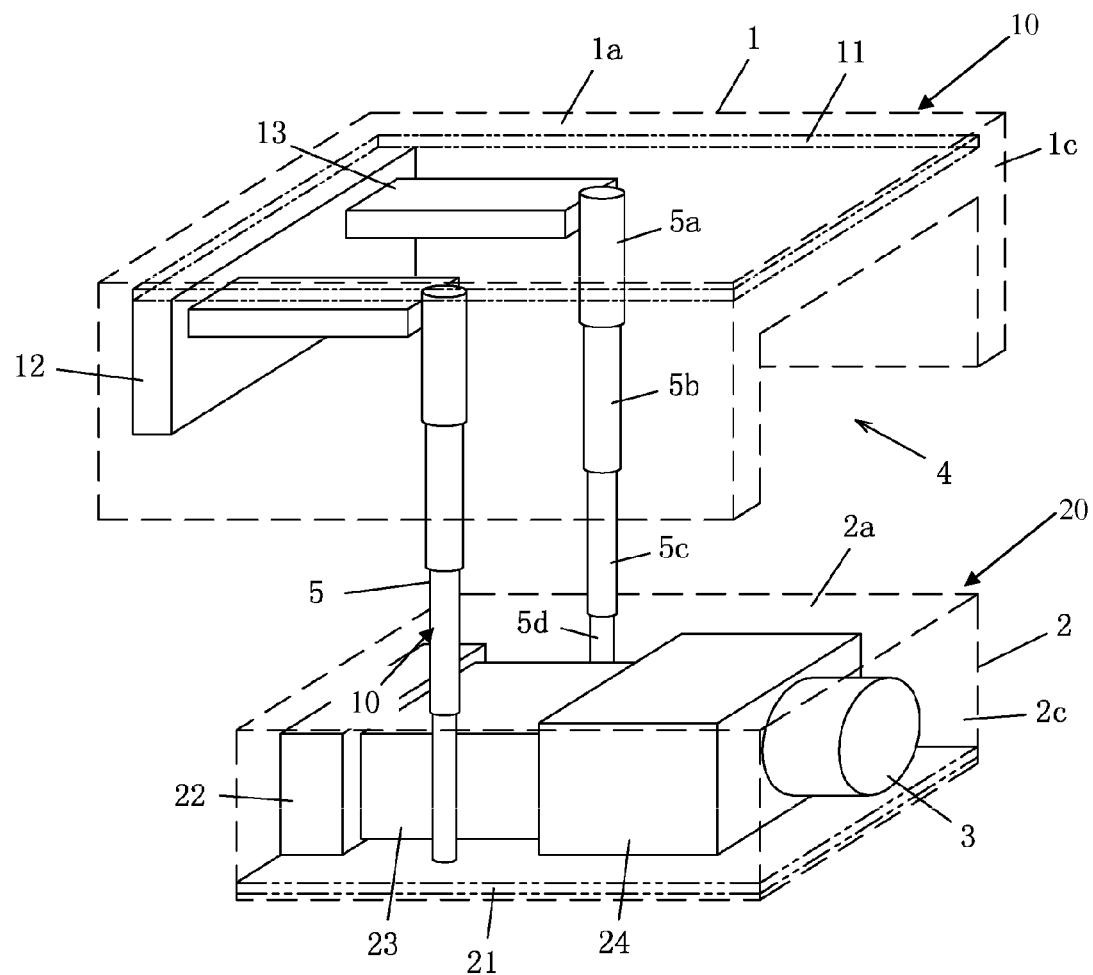
FIG. 5 is a perspective view of an internal structure of the projector in FIG. 1.

FIG. 5 shows an internal structure of the projector. For clarity, the main housing 1 and the sub-housing 2 are shown by dashed lines.

A main circuit board 11 may be provided in the main housing 1 of the main body 10, and functions as an integrated circuit control system of the whole projector. In view of the large size of the main circuit board 11, the main circuit board 11 may be preferably provided close to and parallel to the first surface 1a of the main housing 1. A power source unit and an input/output interface, which are generally indicated by the reference numeral 12, may be provided close to the rear surface of the main housing 1. The power source unit and the input/output interface can be connected to the main circuit 11, and can be exposed from the rear surface of the main housing 1 to facilitate cabling and operation. In addition, a motor and a gear set, which are generally indicated by the reference numeral 13, may be provided in the main housing 1. The motor and the power source unit can be connected and controlled by the main circuit board 11, the gear set can decelerate output rotation of the motor and transmit the rotation to the electric suspension arms 5. Each electric suspension arm 5 may be separately provided with a motor and a gear set, as shown in the figure; or, a single motor may drive all electric suspension arms 5 by using corresponding gear sets.

The electric suspension arm 5 may be of a bamboo-type as shown in the figure, and may also be foldaway-type, or in other forms. In the case of the bamboo-type electric suspension arm 5 shown in the figure, the electric suspension arm 5 may include multiple retractable sections that can be nested or sleeved over one another, and the sections are marked as, for example, 5a, 5b, 5c, and 5d. Along a direction from the main body 10 towards the sub-body 20, diameters of the sections decrease gradually. Kinematic coupling between sections can be implemented by using a threaded movement transmission mechanism, so that relative linear telescopic movement between sections can be implemented under the effect of the rotations of the motor.

The input/output interface may include an operator control interface. An operator can enter an operation instruction by using the control interface, and can control an operation of the motor by using the main circuit board 11, so that the electric suspension arm 5 can extend or retract, thereby implementing an ascending or descending operation of the sub-body 20. When the projector is in a closed state, the electric suspension arm 5 is recessed in the main housing 1 of the main body 10, and is thereby hidden.

A sub-circuit board 21 may be provided in the sub-housing 2 of the sub-body 20, and preferably, the sub-circuit board 21 may be provided close to and parallel to the second surface 2b of the sub-housing 2. In addition, along a direction from the rear to the front of the sub-housing 2, a heat dissipation unit 22, a light source 23, a lens set and an image processing chip 24, and the projection lens 3 may be provided and arranged in that order. Operations of these components can be controlled by the sub-circuit board 21. The sub-circuit board 21 can be electrically connected to the main circuit board 11 and/or electrically connected to the power source unit and the input/output interface through a connection line. The connection line may be embedded in one of the electric suspension arms 5. The light source 23, the lens set and image processing chip 24, and the projection lens 3 may form the optical engine system of the projector. The operator can enter an operation instruction by using the control interface, and thereby can control projection operation of the optical engine system.

It can be understood that a remote control may be provided so as to remotely control the ascending or descending movement and the projection operation of the sub-body (the optical engine system).

The heat dissipation unit 22 can be specially equipped for the optical engine system, so that heat dissipation of the heat dissipation unit 22 can be more efficient.

It can be seen that the projector has an outer shape defined jointly by the main housing 1 and the sub-housing 2 nested in the main housing 1. It can be understood that, although the projector in the example shown in the figure has a substantially cuboid shape, the projector can also have other outer shapes as needed, for example, a cylindrical shape, an elliptic cylindrical shape, a prism shape, an ellipsoid shape, or a combined shape, and the outer shape has a substantially vertical central axis parallel to the electric suspension arms.

Compared with the prior art described in the background, the present patent application has a lot of beneficial effects.

Specifically, the mounting manner of hanging a projector on a wall is generally applicable to short-focus projectors that are used in occasions such as interactive education and conferences, in which the projector projects a large image on a screen at a short distance. An image projection having a corresponding size can be obtained by adjusting the length of a suspension arm, but the height of the image cannot be adjusted. In addition, in the projector hung on a wall, a lot of measures can be taken to reduce the load on the suspension arm, so as to avoid a large bending force on the suspension arm caused by a leverage effect of a horizontal bracket.

In the present patent application, the sub-body is connected to the main body through the vertical electric suspension arms, and therefore the electric suspension arms do not have a bending force or distortion problem.

For a projector having an electric bracket, the electric bracket is used for fixing the projector to a ceiling so as to provide functions as to the ascending or descending movements of the projector and concealment the projector.

The present patent application uses the embedded electric suspension arm and the movable optical engine system to adjust the height of an image projection produced by the projector. Moreover, because the electric suspension arm and the optical engine system can be hidden in the main housing 1, the projector in the closed position looks decently presentable. In addition, a user only needs to mount the first surface of the main housing 1 on the ceiling; therefore, installation procedures are simplified, and costs are reduced.

While the projector has been shown and described with particular references to a number of preferred embodiments thereof, it should be noted that various other changes or modifications may be made without departing from the scope of the appended claims.

What is claimed is:

1. A projector comprising:
   a main housing defining a cavity, and having a front opening and a side opening;
   a sub-housing in which an optical engine system is mounted; and
   at least one electric suspension arm having a first end connected to the main housing and a second end connected to the sub-housing;
   wherein the sub-housing is movable between a retracted position where both the sub-housing and the electric suspension arm are received in the cavity, and an extended position where the sub-housing is extended out from the main housing;
   and, in the retracted position, the main housing and the sub-housing form a continuous projector contour;
   wherein the main housing comprises a main housing first surface and a main housing second surface that are opposite to each other, and a main housing front surface connected between the main housing first surface and the main housing second surface;
   the main housing first surface is a mounting surface or a support surface of the projector, and the cavity has a first opening on the main housing second surface and a second opening on the main housing front surface;
   the sub-housing comprises a sub-housing first surface and a sub-housing second surface that are opposite to each other, and a sub-housing front surface connected between the sub-housing first surface and the sub-housing second surface;
   in the closed position, the sub-housing front surface flushes with the main housing front surface, and the sub-housing second surface flushes with the main housing second surface.

2. The projector according to claim 1, wherein the electric suspension arm is in the form of a telescopic arm.

3. The projector according to claim 1, wherein a main circuit board, a power source unit, and an input/output interface are provided in the main housing; and the power source unit and the input/output interface are connected to the main circuit board.

4. The projector according to claim 1, wherein the optical engine system comprises a light source, a lens set, an image-processing chip, and a projection lens.

5. The projector according to claim 2, comprising two telescopic electric suspension arms provided on two opposite sides of the optical engine system.

6. The projector according to claim 3, wherein a motor and a gear set are provided in the main housing, the motor is connected to the power source unit and is controlled by the main circuit board, and the gear set decelerates output rotation of the motor and transmits the rotation to the electric suspension arm.

7. The projector according to claim 3, wherein a sub-circuit board is provided in the sub-housing, and the sub-circuit board is electrically connected to the main circuit board and controls operation of the optical engine system.

8. The projector according to claim 6, wherein the input/output interface comprises an operator control interface for controlling overall operation of the projector, the overall operation comprises ascending or descending operation and projection operation of the sub-body.

9. A projector, comprising:
   a main body;
   a sub-body comprising an optical engine system; and
   a telescopic electric suspension arm comprising a first end fixed in the main body and a second end connected to the sub-body,
   wherein when the electric suspension arm retracts, the projector is in a closed position, and both the sub-body and the electric suspension arm are received in the main body; and when the electric suspension arm extends, the projector is in an open position, and the sub-body moves out from the main body; and
   wherein the main body comprises a main housing that defines a cavity; the sub-body comprises a sub-housing; in the closed position, the sub-body is located inside the cavity, and the main housing and the sub-housing form a continuous projector contour;
   wherein the main housing comprises a main housing first surface and a main housing second surface that are opposite to each other, and a main housing front surface connected between the main housing first surface and the main housing second surface;
   the main housing first surface is a mounting surface or a support surface of the projector, and the cavity has a first opening on the main housing second surface and a second opening on the main housing front surface;
   the sub-housing comprises a sub-housing first surface and a sub-housing second surface that are opposite to each other, and a sub-housing front surface connected between the sub-housing first surface and the sub-housing second surface;
   in the closed position, the sub-housing front surface flushes with the main housing front surface, and the sub-housing second surface flushes with the main housing second surface.

10. The projector according to claim 9, wherein the first opening has a same shape and size as the sub-housing second surface; and the second opening has a same shape and size as the sub-housing front surface such that the sub-housing front surface is capable of being inserted therein smoothly.

11. The projector according to claim 9, wherein the projector is mounted on a ceiling or supported on a desktop by the main housing first surface, and a retraction direction of the electric suspension arm is perpendicular to the main housing first surface.

12. The projector according to claim 9, wherein the main body comprises a main circuit board, a power source unit, and an input/output interface that are provided in the main housing; and the power source unit and the input/output interface are connected to the main circuit board.

13. The projector according to claim 9, wherein the optical engine system is provided in the sub-housing and comprises a light source, a lens set, an image-processing chip, and a projection lens.

14. The projector according to claim 9, wherein the sub-body further comprises a heat dissipation unit provided in the sub-housing for dissipating heat from the optical engine system.

15. The projector according to claim 9, further comprising a remote control for controlling overall operation of the projector, and wherein the overall operation comprises ascending or descending operation and projection operation of the sub-body.

16. The projector according to claim 12, wherein the main body further comprises a motor and a gear set that are provided in the main housing, the motor is connected to the power source unit and is controlled by the main circuit board, and the gear set decelerates output rotation of the motor and transmits the rotation to the electric suspension arm.

17. The projector according to claim 12, wherein the input/output interface comprises an operator control interface for controlling overall operation of the projector, the overall operation comprises ascending or descending operation and projection operation of the sub-body.

18. The projector according to claim 12, wherein the sub-body further comprises a sub-circuit board arranged in the sub-housing, and the sub-circuit board is electrically connected to the main circuit board and controls operation of the optical engine system.

\* \* \* \* \*